Dec. 22, 1964 H. J. BIRKENBEIL 3,161,946

METHOD FOR THE PRODUCTION OF THIN MAGNETIC LAYERS WITH REPRODUCIBLE AND STABLE PROPERTIES

Filed Nov. 2, 1961

INVENTOR
HANS J. BIRKENBEIL

BY [signature]

ATTORNEY

United States Patent Office 3,161,946
Patented Dec. 22, 1964

3,161,946

METHOD FOR THE PRODUCTION OF THIN MAGNETIC LAYERS WITH REPRODUCIBLE AND STABLE PROPERTIES

Hans J. Birkenbeil, Boblingen, Baden-Wurttemberg, Germany, assignor to International Business Machines Corporation, New York, N.Y., a corporation of New York Filed Nov. 2, 1961, Ser. No. 149,560
Claims priority, application Switzerland Mar. 30, 1961
4 Claims. (Cl. 29—155.5)

This invention relates to an improved structure for and a method of making magnetic memory elements and more particularly to magnetic memory elements comprising a continuous thin film of ferromagnetic material.

It is well known that bistable memory elements may be produced by depositing a continuous coating of ferromagnetic material, such as permalloy, a Ni—Fe alloy, in the presence of a magnetic field. Deposition of the magnetic material is achieved by any one of a number of known methods, such as vacuum vaporization or cathode atomization (sputtering). Deposition of the magnetic material in the presence of a magnetic field insures that the coating of magnetic material exhibits an anisotropic characteristic or easy axis of magnetization defining opposite remanent stable states of flux orientation. The coating or layer of deposited magnetic material is usually of an order of 100 A.–1000 A. thick (1 A.$=10^{-8}$ cm.). In practice, it is desirable that the magnetic layer have a distinct magnetic anisotropy, the anisotropy field strength HK and the coercive force Hc for wall motion being of small magnitude. For example, an anisotropy field strength HK should be between 2 to 5 oersteds and Hc should be between 0.5 and 3 oersteds. When such magnetic layers are deposited on non-magnetic, electrically non-conductive substitutes, such as glass, the desired magnetic properties of the layer are easily reproduced, and magnetic as well as mechanical properties of the layer remain stable for a long time.

In order to achieve switching of such magnetic bistable thin film memory elements at high repetition frequencies, it becomes necessary to place electrical conductors, in the form of striplines, very close to the magnetic layer. The distance between the magnetic layer and the conductor is usually within an order of magnitude of 0.01 mm. (10 $\mu$m.), or less. When the magnetic layer is deposited onto a glass substrate, then the substrate is between the conductor and the layer. Since mechanically stable glass plates of a thickness of 10 $\mu$m. or less are not available, the high repetition switching frequency for such elements could not be achieved. In order to overcome this obstacle, a magnetic layer was deposited directly onto a substrate of good metallic electrical conductor material, such as silver or aluminum, with or without an insulating layer of silicon oxide in between, where the metallic substrate was used to carry current to produce the necessary driving fields for switching the magnetic layer. It has been found, however, that deposited magnetic coatings on the metallic substrate provide elements wherein the magnetic and mechanical properties of the layers are not reproducible nor stable within the desired tolerances set forth above. In particular, elements produced by this latter method show an undesirable high stray of anisotropy, i.e. the easy axis is not distinct within desirable limits, the coercive force Hc is too high and frequently is higher than the anisotropy field strength HK, and, most detrimental, the deposited magnetic layers peel off from the metallic substrate after a period of time.

It has been found that the above difficulties are overcome by making a magnetic memory element according to this invention. Specifically, bistable elements having a thin magnetic layer with reproducible and stable properties are produced by providing a non-magnetic, electrically conductive, metallic substrate member having one surface plasticly deformed to exhibit a Beilbyan layer. Plastic deformation is preferably carried out by mechanical polishing or rolling. Next, a continuous coating is deposited on the one surface of said substrate member of a second non-magnetic metallic material. The second material has a melting point of about 1300° C. and the substrate is kept at a minimum temperature of 100° C., and a maximum temperature above which recrystallation of said second metallic material takes place on the surface of the substrate during deposition of the second material. Thereafter a continuous coating of ferromagnetic material is deposited either on the surface of said second metallic material or a coating of insulating material is first deposited on the surface of the second material and then the ferromagnetic material is deposited. In each instance the ferromagnetic material is deposited in the presence of an orienting magnetic field.

Accordingly, it is a prime object of this invention to provide an improved structure for a magnetic thin film memory element.

Another object of this invention is to provide an improved method of making magnetic thin film memory elements.

Still another object of this invention is to provide a method of making an improved magnetic thin film memory element capable of being switched at high repetition frequency whose mechanical and magnetic properties remain stable.

The foregoing and other objects, features and advantages of the invention will be apparent from the following more particular description of preferred embodiments of the invention, as illustrated in the accompanying drawings.

Figure 1:
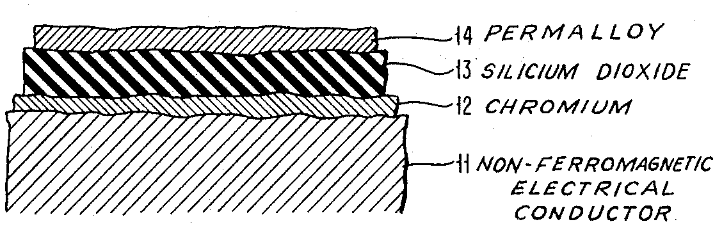
FIG. 1 shows a cross section of the layers deposited onto a metallic plate according to a first embodiment.

With reference to FIG. 1 a first embodiment of the inventive method for the production of thin magnetic layers with reproducible and stable properties within prescribed tolerances is described, whereby the different steps of the method are successively explained. The carrier or base plate is an electrically well conducting, non-ferromagnetic metallic plate 11. The thickness of the plate is not critical; it should, however, be such that it guarantees sufficient mechanical resistance for self-supporting. For example, metal sheets with a thickness of approximately 0.5 mm. are suitable. In order to fulfill the requirement of a good electrical conductivity, it is useful to choose a (first) metal or a metal alloy with a small specific resistance, i.e. below $5\times10^{-6}$ ohm cm. It is evident, that plates or sheets of copper, gold or silver are very suitable. Aluminum and metallic alloys have also proved to be suitable.

The metallic plate 11 is mechanically polished or rolled until the surface of the side onto which the layers are to be placed is extremely smooth, i.e. represents a so-called Beilbyan layer, as known to anyone skilled in the metallic art. A Beilbyan layer is characterized by a plastically strong deformed structure and vast leveled grain boundaries. Tests have proved that electrolytical polishing of the surface has not given satisfactory results, as it edges the grain boundaries and thereby produces an undesired roughness.

Onto the metallic plate 11 prepared in the just described manner, there is applied next a thin layer 12 of a second non-ferromagnetic metal having high melting point, possibly above 1300° C. This layer can be applied either by cathode atomization or vaporization of the second metal in vacuum, which should possibly be higher than $10^{-4}$ Torr. The particles of the atomized or evaporated second metal are deposited onto the substrate formed by the metal plate 11. It is necessary to keep the temperature of the substrate within certain limits in order to achieve the desired advantages of the inventive method. For reasons to be mentioned later, the substrate temperature should not fall below +100° C, at least during the deposition of the metal layer 12, and, on the other hand, should not be too high in order to avoid a recrystallization on the substrate surface during the deposition of the particles of the atomized or vaporized second metal, respectively. Within this range of temperature, high temperatures should preferably be chosen. Although, in most cases, a certain heating-up of the substrate is effected already by the heat radiation from the evaporation source and by heat transmission due to the deposition of the particles onto the substrate, this will not always be sufficient to keep the temperature of the substrate at the desired height. It is, therefore, advisable to provide an additional heating source, i.e. an electrical heating coil to heat up the substrate. A thermoelement can control the temperature of the substrate surface.

The above mentioned values and tolerances which are considered essential for the inventive method are to be explained as follows: The higher the melting point of a metal, the higher the substrate temperatures can be for vaporization, without leading to recrystallization of the metal during the deposition of the particles. Recrystallization deteriorates the smoothness of the surface, and thus increases considerably the occurrence of bad properties of the magnetic layers to be deposited later. On the other hand it is desired to keep up the elevated temperature during the production process to increase the adhesion of the layers. For the evaporation process the vaporization temperature of the material to be vaporized is of great importance, as it has to be brought to a temperature at which it evaporates sufficiently. The vaporization temperature is usually the temperature at which the material has a vapor pressure of $10^{-2}$ Torr. As the layers are usually produced in a vacuum apparatus it is decisive that during the entire process a certain vacuum, e.g. better than $10^{-4}$ Torr, and a neutralized residual gas atmosphere are kept up, and it is therefore disadvantageous if the evaporation source in the vacuum apparatus must be heated up too much. For this reason too high vaporization temperatures of the materials to be evaporated are not desirable.

A very suitable material for the layer 12, vastly fulfilling practically all the mentioned properties, is chromium, it has good adhesive properties with respect to further evaporated layers and evaporates from the solid state far below the melting temperature. The vaporization temperature—in the above defined sense—of chromium is around 1150° C.; its melting point is at 1950° C. If chromium is evaporated, the substrate can have a temperature up to about 300° C and even more, without leading to recrystallization of the chromium on the substrate surface. The inventive manufacturing process can, for instance, be realized in that a chromium layer 12 of a thickness of several 100 A. (but not much over 1000 A.) is evaporated at a substrate temperature of about 200 to 250° C. onto a peraluman alloy plate 11. The vacuum in the evaporation apparatus should be between $10^{-5}$ and $10^{-4}$ Torr. The chrominum evaporation source can be heated up to a temperature of between 1000° and 1500° C.

There is next deposited an insulating intermediate layer 13. This layer also can be produced by vaporization. Preferably a silicon dioxide layer of a thickness of several 100 to several 1000 A. is provided. A silicon dioxide layer of this thickness does not deteriorate the smoothness of the surface; on the contrary, the still existing roughness is rather leveled. While experimental tests have shown that relatively thick (several 1000 A. silicon dioxide layers, which have been evaporated onto a silver or aluminum substrate have a bad adhesion, it has proved that they have a very good adhering property on a chromium substrate. The silicon dioxide layer is again evaporated at a pressure between $10^{-5}$ and $10^{-4}$ Torr. It is practical, to heat up the substrate again, and to keep it at a temperature of 100° C. or higher, for instance, during the evaporation process.

A last step is finally the evaporation of the ferromagnetic layer 14, in the manner known, whereby, in order to produce a uniaxial magnetic anisotropy, the layer is evaporated in the presence of a D.C. field. A permalloy (approximately 80% Ni, 20% Fe) is preferably used for the ferromagnetic substance. Evaporation again takes place in vacuum (approximately $10^{-5}$ to $10^{-4}$ Torr) and simultaneously the substrate is heated up (approximately 200° C.). The thickness of the layer is between several 100 to 1000 A., according to the requirements.

For certain thin film switching circuits it is not required or not even desirable, that the ferromagnetic layer 14, representing the switching element, is electrically insulated by an intermediate layer 13 from the metallic substrate being represented by the layers 11 and 12 and serving to feed-in the switching and driving currents, respectively. This can be achieved in that in the manufacturing process the above described step of evaporating the insulating intermediate layer 13 is omitted and the ferromagnetic layer 14 is immediately evaporated onto the chromium layer 12. The evaporation takes place—as described above—in vacuum, and the substrate is heated up simultaneously.

Figure 2:
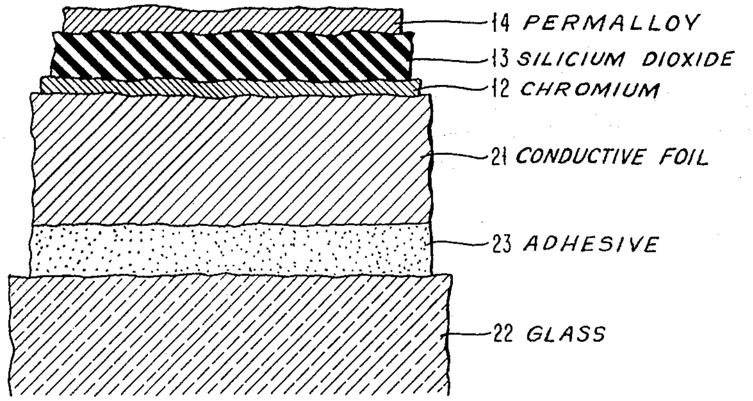
FIG. 2 shows a cross section of the layers deposited onto a metallic foil, according to a second embodiment, whereby the metal foil is glued onto a carrier of any choosen material.

With reference to FIG 2 there is now described a variation of the inventive method for the production of thin magnetic layers. To start with, a thin foil 21 of a well conducting metallic material (e.g. silver, copper, gold, aluminum or alloys also) is applied. This foil can be produced by rolling. It is possible to roll metalic foils to a thickness of several μm. This rolling itself can bring about sufficient plastic deformation of the surface of the material, so that a Beilbyan layer is formed. If the expected result cannot be obtained by mere rolling, the surface has to be mechanically repolished with a polishing cloth to obtain the Beilbyan layer. A silver foil rolled out to 20 μm. and having been annealed in vacuum at approximately 300° C. before being used has shown satisfactory results.

The metal foil 21 treated this way is glued onto a substrate plate 22, consisting of any material, i.e. glass or heat resisting plastics, preferably with an adhesive based on silicon. The adhesive layer is indicated by 23 in FIG. 2. The adhesive Rhodorsil XCAF 4 (trademark) which is essentially a diorganopolysiloxane composed of elements of the general formula $R_2SiO$ in which R is an hydrocarbon group of linear structure, as described more fully in "Industrie does Plastiques Modernes," March 1951, vol. 3, pages 7–10, and May 1951, vol. 3, No. 5, pages 8 and 9, and in French Patent 1,198,749, has proved very suitable, as it is resistant to temperatures of 200° C and more and does not deteriorate the vacuum or the residual gas atmosphere in the vacuum apparatus.

Further steps of the manufacturing process take place as described with reference to FIG. 1, e.g. there are evaporated in turn a chromium layer 12 (with a thickness of approximately 200 to 1000 A.), a silicon dioxide layer 13 (with a thickness of approximately 500 to 2000 A.) and finally a permalloy layer 14 (approximately 80% Ni and 20% Fe; with a thickness of approximately 100 to 3000 A., according to the requirements.

The good consistency observed between silver or aluminum as a first metal on one side and chromium as a second metal on the other, may reside in the fact that the lattice spacings of the mentioned metals are within the same order of magnitude, i.e. their variation is within approximately 10%.

While the invention has been particularly shown and described with reference to preferred embodiments thereof, it will be understood by those skilled in the art that various changes in form and details may be made therein without departing from the spirit and scope of the invention.

What is claimed is:

1. A method of making magnetic memory elements comprising the steps of, plasticly deforming one surface of a planar, non-magnetic, electrically conductive, metallic substrate member having a specific resistance below $5\times10^{-6}$ ohm cm. to form at said one surface a Beilbyan layer; maintaining said substrate member within a predetermined temperature range while depositing a continuous layer of a second non-magnetic metallic material, having a melting melting point above approximately 1300° C. and a lattice spacing which diverges from the metal of said substrate member by less than 15%, on the one surface of said substrate member, said predetermined temperature range being 100° C. minimum and a maximum temperature which if exceeded produces recrystallization of the second metallic material when deposited on said substrate member; and thereafter depositing a continuous thin film layer of ferromagnetic material in the presence of an orienting magnet field.

2. A method of making magnetic memory elements comprising the steps of, plasticly deforming one surface of a planar, non-magnetic, electrically conductive, metallic substrate member to form at said one surface a Beilbyan layer; maintaining said substrate within a predetermined temperature range while depositing a continuous thin film layer of a second non-magnetic metallic material on the one surface of said substrate member, said second metallic material having a melting point above approximately 1300° C. and a lattice structure which diverges from the metal of said substrate member by less than 15%, said predetermined temperature range being 100° C. minimum and a maximum temperature which if exceeded produces recrystallization of the second metallic material when deposited on said substrate member; and thereafter depositing a continuous thin film layer of ferromagnetic material in the presence of an orienting magnetic field.

3. A method of making magnetic memory elements comprising the steps of, plasticly deforming one surface of a planar, non-magnetic, electrically conductive substrate member having a specific resistance below $5\times10^{-6}$ ohm cm., to form at said one surface a Beilbyan layer; maintaining said substrate within a predetermined temperature range while depositing a continuous thin film layer of chromium on the one surface of said substrate member, said predetermined temperature range being 100° C. minimum and a maximum temperature which if exceeded produces recrystallization of the chromium when deposited on said substrate member; and thereafter depositing a continuous layer of ferromagnetic material in the presence of an orienting magnetic field.

4. A method of making magnetic memory elements comprising the steps of, plasticly deforming one surface of a planar aluminum substrate member to form at said one surface a Beilbyan layer; maintaining said aluminum substrate at a temperature of 200° C. to 250° C. while depositing a continuous thin film layer of chromium on the one surface of said aluminum substrate; and thereafter depositing a continuous thin film layer of ferromagnetic material in the presence of an orienting magnetic field.

References Cited in the file of this patent

UNITED STATES PATENTS

| | | |
|---|---|---|
| 2,853,402 | Blois | Sept. 23, 1958 |
| 2,923,642 | Hansen | Feb. 2, 1960 |
| 2,976,174 | Howard | Mar. 21, 1961 |
| 2,999,766 | Ashworth et al. | Sept. 12, 1961 |

FOREIGN PATENTS

| | | |
|---|---|---|
| 670,993 | Great Britain | Apr. 30, 1952 |
| 751,843 | Great Britain | July 4, 1956 |
| 759,486 | Great Britain | Oct. 17, 1956 |